Aug. 17, 1943.  E. KOMENDA  2,326,952
VEHICLE BODY AND METHOD OF MAKING SAME
Filed May 16, 1939
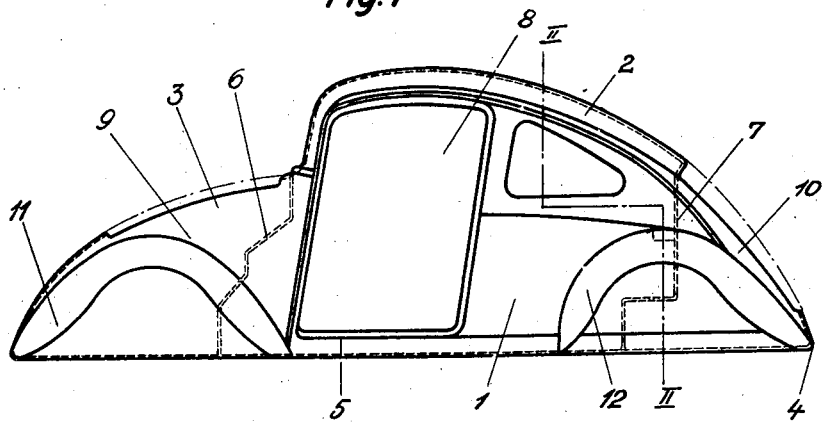
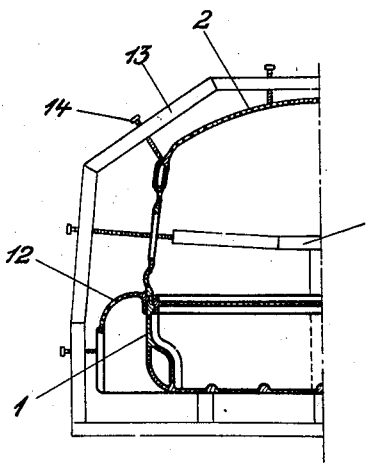
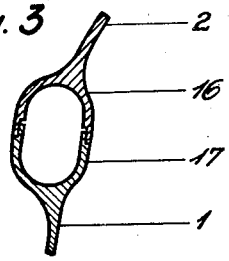
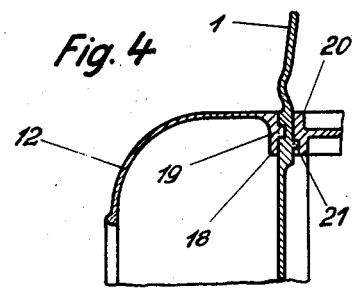
Inventor
ERWIN KOMENDA
By
Attorneys Patented Aug. 17, 1943

2,326,952

UNITED STATES PATENT OFFICE 2,326,952

VEHICLE BODY AND METHOD OF MAKING SAME

Erwin Komenda, Stuttgart-Korntal, Germany; vested in the Alien Property Custodian Application May 16, 1939, Serial No. 273,915
In Germany May 20, 1938

4 Claims. (Cl. 296—31)

This invention relates to vehicle bodies and method of making same, and is particularly directed to such bodies formed of artificial material.

An object of this invention is the production of a novel vehicle body.

Another object of this invention is to provide a novel method of assembling a vehicle body of artificial material.

A further object of this invention is the provision of a vehicle body of artificial material, which may be easily, quickly and cheaply assembled.

Still another object of this invention is to provide a vehicle body of artificial material, in which damaged parts are easily replaced, and which is so designed as to suffer a minimum of damage upon collision.

A more specific object of this invention is the provision of a vehicle body of artificial material in which the various body parts are rigidly interconnected with one another without the use of bolts and nuts, rivets, or any other extraneous elements.

Further objects and advantages of this invention will be apparent from considerations of the specification as illustrated by the accompanying drawing of possible embodiments of the invention, in which drawing:

Fig. 1 is a side view of a vehicle body formed in accordance with the principles of this invention;

Fig. 2 is a cross-sectional view along the line II—II of the body illustrated in Fig. 1, shown in connection with an assembling frame;

Fig. 3 is a cross-sectional view of a portion of the body shown in Fig. 2, but drawn to a larger scale; and Fig. 4 is a further cross-sectional view similar to Fig. 2 on a larger scale, of a further detail of the body construction.

The invention has been illustrated in the figures by way of example, as applied to a vehicle body in which the vehicle engine is adapted to be mounted in the rear, although it will be obvious from the further description that the invention is not limited to bodies of this type, but rather is applicable to vehicle bodies generally.

As is best illustrated in the side view of the vehicle in Fig. 1, the vehicle body consists of the usual side wall 1, a roof 2 extending forwardly to the apron 3 and rearwardly to the end of the vehicle 4, a floor 5, and transverse walls 6 and 7 which respectively divide the interior or passenger compartment 8 from the forward baggage space 9 and the rear engine space 10. Front fenders 11 are adapted to be connected to the apron 3 on either side of the vehicle, while rear fenders 12 are interconnected with the side wall 1 in a manner to be described in more detail.

Each of the various body parts, such, for example, as the side walls 1, the roof 2, the floor 5, and the transverse walls 6 and 7 are adapted to be formed in any suitable manner as an integral piece of artificial material, such as artificial resin. The particular manner of fabricating the individual parts is of unimportance with respect to this invention, as is the particular type of artificial material from which they are made. It has been suggested, that the various body parts may be made from artificial material having as its basis phenol, cellulose, polyvinyl or urea products; the individual parts may be laminated or unlaminated.

The various body parts of artificial material are preferably assembled in a suitable frame having suitable spindles for pressing and holding the parts together, as illustrated in Fig. 2 by the reference numerals 13, 14 and 15. It is preferable that the assembled parts are so formed that all crossing seams are avoided and the connections are brought by either a straight abutment between the ends of the various body parts, or by means of a suitable T-connection.

One of the objects of this invention, as stated above, is to assemble the various body parts of artificial material without the use of nuts and bolts, rivets, and the like, which are extremely objectionable in that they necessitate the formation of holes in the various body parts, thus structurally weakening these parts, they are difficult to put in place in many relatively inaccessible parts of the body, they tend to mar the appearance of the vehicle, and particularly in the case of nuts and bolts loosening of the connections is inevitably produced. All of these disadvantages are avoided by the body produced in accordance with this invention, wherein the connections between the various body parts are made by adhesion between these parts, either through the insertion of a suitable adhesive material, or by simply heating and pressing together the contacting edges of these body parts.

In the first of the methods, the body is assembled in a suitable framework, such as illustrated in Fig. 2, and pressed together with a suitable adhesive material between the joints. Depending upon the type of adhesive used, in some cases pressure alone is sufficient to form a rigid connection between the various body parts, while in other cases both pressure and heat are applied.

In this latter case, the frame work may be so formed that it, together with the enclosed assembled body, may be readily moved into an oven, or the like. The particular type of adhesive is unimportant, although it is advantageous if the adhesive is similar to the material from which the body parts are made, and for example, may have a phenol, urea, or cellulose basis; it is, of course, important that the adhesive to be used must be insoluble not only in water, but also insoluble in the oil and fuel for the vehicle.

The various body parts may also be interconnected by the application of localized heat, melting the material along its contacting edges, which is substantially a form of welding.

Fig. 3 illustrates an advantageous structural detail which may be used in a vehicle body formed in accordance with this invention. As there illustrated, the longitudinally extending edges of the roof 2 are formed in the shape of a two-armed fork 16, which will slightly overlap and abut against a similar upwardly directed two-armed fork 17 formed along the longitudinal upper edges of the side wall 1. Upon the joining of these arms, by one of the methods previously described, or, in fact by any other suitable means, there will be formed an integral longitudinally extending strengthening beam. In a similar manner, a longitudinal hollow beam may be formed at the connection between the vehicle floor 5 and the lower edge of the side walls 1, as can be seen in the lower left hand corner of the body illustrated in Fig. 2.

The supplemental members such as the fenders 11 and 12, may be attached to the body in any suitable manner. For example, in this case, it is sometimes advantageous that here a threaded type of attachment be used so that in case of damage the fenders may be easily removed and replaced. In this case, any holes which are necessary for the attachment may, for example, be covered by rubber plugs which will tend to hold the threaded members in place. However, the fenders may also be attached to the vehicle body by the same means and at the same time as the other body parts are connected with one another. This method of attachment is illustrated particularly in Figs. 2 and 4, the latter illustrating a further constructional detail, showing how the mudguard may be provided with an abutting flange 18 having a projecting tooth or teeth 19 which may extend into a suitable groove in the side wall 1. By this means, a proper relative positioning of the two parts is assured.

The manner of connecting the mudguard with the side wall through a toothed connection, can also be extended to the interconnection of other parts, such, for example, as the interconnection between the transverse wall 7 and the side wall 1. As shown in Fig. 2, and in more detail in Fig. 4, in this case the transverse wall 7 is provided with a flanged portion 20 adapted to receive a tooth or teeth 21 formed integrally with the side wall 1. In this manner, proper relative alignment of the side walls and transverse walls is assured. It is to be pointed out, however, that the particular types of grooves and teeth illustrated, are only shown by way of example, and any other suitably shaped teeth and grooves may be used.

From the above description it will be seen that I have provided a novel type of vehicle body which satisfies all the objects previously enumerated. A body produced in the manner described will have a very low weight since it does not need additional connecting members. At the same time it can be easily and cheaply produced and will result in a construction having high rigidity and strength. The manner of connecting the parts has the further advantage that in case of possible collision, the interconnected parts will tend to shear along the joints, so that the number of parts damaged is reduced. The production of the individual body parts is also less expensive since they do not need to be drilled or otherwise formed with holes for the otherwise present connecting members. At the same time, the absence of supplemental connecting members results in a pleasing appearance of the body, both from within and from without.

While I have shown the invention in certain physical embodiments, it is to be understood that modifications of the structure and the methods of assembling the same may be made by those skilled in this art without departing from my invention as expressed in the following claims.

I claim:

1. As an article of manufacture, a vehicle body comprising mutually interlocking adherent pieces of artificial resinous material respectively forming the side walls, roof, front and rear walls and transverse walls thereof, the longitudinal edges of said roof being fork-shaped in the form of two depending arms integral with said roof, and the upper longitudinal edges of said side walls being fork-shaped with two upstanding arms integral with said side walls connecting with said depending arms to form a hollow longitudinal body beam.

2. A vehicle body having a roof of artificial material, the longitudinal edges of which are formed with a pair of forked depending arms, in combination with side walls of artificial material for said body, whose longitudinal upper edges are formed with a pair of upstanding forked arms connected to said depending arms to form between them a longitudinally extending hollow roof rail.

3. A vehicle body having a floor of artificial material having upturned forked longitudinal edges, and side walls of artificial material whose lower longitudinal edges are provided with dependent forked arms cooperating with the upturned forked edges of said floor to form a hollow longitudinally extending body beam.

4. As an article of manufacture, a vehicle body comprising mutually interlocking adherent pieces of artificial resinous material respectively forming the side walls, roof, front and rear walls, floor and transverse walls thereof, said floor having upturned forked longitudinal edges, and the lower longitudinal edges of said side wall being provided with dependent forked arms cooperating with the upturned forked edges of said floor to form a hollow longitudinally extending body beam.

ERWIN KOMENDA.